Sept. 30, 1969 J. M. FULLTON, JR 3,470,364

CIRCUIT FOR DETECTING A REGISTER MALFUNCTION

Filed Feb. 10, 1966 2 Sheets-Sheet 1

INVENTOR.
J. M. Fullton, Jr.,
BY
S. Gundersen
ATTORNEY

FIG. 2

| PULSE NUMBER | | | 1 | | 2 | | 3 | | 4 | | 5 | | 6 | | 7 | | 8 | |
|---|---|---|---|---|---|---|---|---|---|---|---|---|---|---|---|---|---|---|
| CLOCK INPUT | | 0 | 1 | 0 | 1 | 0 | 1 | 0 | 1 | 0 | 1 | 0 | 1 | 0 | 1 | 0 | 1 | 0 |
| Binary Register 14 | 1st Stage 13 | 0 | 0 | 1 | 1 | 0 | 0 | 1 | 1 | 0 | 0 | 1 | 1 | 0 | 0 | 1 | 1 | 0 |
| | 2nd Stage 39 | 0 | 0 | 0 | 0 | 1 | 1 | 1 | 1 | 0 | 0 | 0 | 0 | 1 | 1 | 1 | 1 | 0 |
| | 3rd Stage 59 | 0 | 0 | 0 | 0 | 0 | 0 | 0 | 0 | 1 | 1 | 1 | 1 | 1 | 1 | 1 | 1 | 0 |
| | Parity | 0 | 0 | 1 | 1 | 1 | 1 | 0 | 0 | 1 | 1 | 0 | 0 | 0 | 0 | 1 | 1 | 0 |
| Code Converter 19 | 1st Stage 18 | 0 | 1 | 1 | 0 | 0 | 1 | 1 | 0 | 0 | 1 | 1 | 0 | 0 | 1 | 1 | 0 | 0 |
| | 2nd Stage 34 | 0 | 0 | 1 | 1 | 1 | 1 | 0 | 0 | 0 | 0 | 1 | 1 | 1 | 1 | 0 | 0 | 0 |
| | 3rd Stage 54 | 0 | 0 | 0 | 0 | 1 | 1 | 1 | 1 | 1 | 1 | 1 | 1 | 0 | 0 | 0 | 0 | 0 |
| | 3 Stage Parity | 0 | 1 | 0 | 1 | 0 | 1 | 0 | 1 | 1 | 0 | 1 | 0 | 1 | 0 | 1 | 0 | 0 |
| | 4th Stage (Not Shown) | 0 | 0 | 0 | 0 | 0 | 0 | 0 | 0 | 1 | 1 | 1 | 1 | 1 | 1 | 1 | 1 | 1 |
| | 4 Stage Parity | 0 | 1 | 0 | 1 | 0 | 1 | 0 | 1 | 0 | 1 | 0 | 1 | 0 | 1 | 0 | 1 | 1 |
| Combined 3 Stage Gray Code and Binary 3rd Stage Parity | | 0 | 1 | 0 | 1 | 0 | 1 | 0 | 1 | 0 | 1 | 0 | 1 | 0 | 1 | 0 | 1 | 0 |

United States Patent Office 3,470,364
Patented Sept. 30, 1969

3,470,364
CIRCUIT FOR DETECTING A REGISTER MALFUNCTION

James M. Fullton, Jr., Greensboro, N.C., assignor to Western Electric Company, Incorporated, New York, N.Y., a corporation of New York Filed Feb. 10, 1966, Ser. No. 526,410
Int. Cl. G06f *11/00;* H04l *3/00;* H03k *13/00*
U.S. Cl. 235—153 6 Claims

ABSTRACT OF THE DISCLOSURE

A circuit converts the code of a binary register to a second code having a parity which alternates in correspondence to the presence and absence of pulses in the input signal. The circuit senses the parity of the second code and compares the sensed parity to the input signal.

This invention relates to an error detecting circuit and more particularly to a circuit for detecting a malfunction of a register or counter.

Input signals to a register change the states of various bistable stages of the register wherein the states of all the stages represent different addresses or binary numbers of a code. One convenient way of detecting a malfunction of the register is to monitor the parity of all the stages; that is, determine whether an odd number or an even number of bistable stages is in a particular state. The parity of all the stages is then compared with a parity prediction circuit to sense a malfunction of the register. In the ordinary binary register, the parity of the stages follows an irregular pattern as the register switches to succeeding binary numbers which necessitates a complex parity prediction circuit to predict the irregular pattern.

Accordingly, it is an object of the present invention to provide a new and improved parity checking circuit.

Another object of the invention is a circuit for comparing the parity of a binary register or counter with the input signal to the register.

An additional object of the invention is a circuit for converting the code of the binary register to a second code having a parity which corresponds to the input signal of the register.

With these and other objects in view, the present invention contemplates a circuit for converting the code of a binary register to a second code having a parity which alternates in correspondence to the presence and absence of pulses in the input signal. The circuit senses the parity of the second code and compares the sensed parity to the input signal.

A complete understanding of this invention may be had by reference to the following detailed description when considered in conjunction with the accompanying drawings, wherein:

FIG. 2 is a table showing the states of various stages of the circuit shown in FIG. 1 and the parity of those stages.

Figure 1:
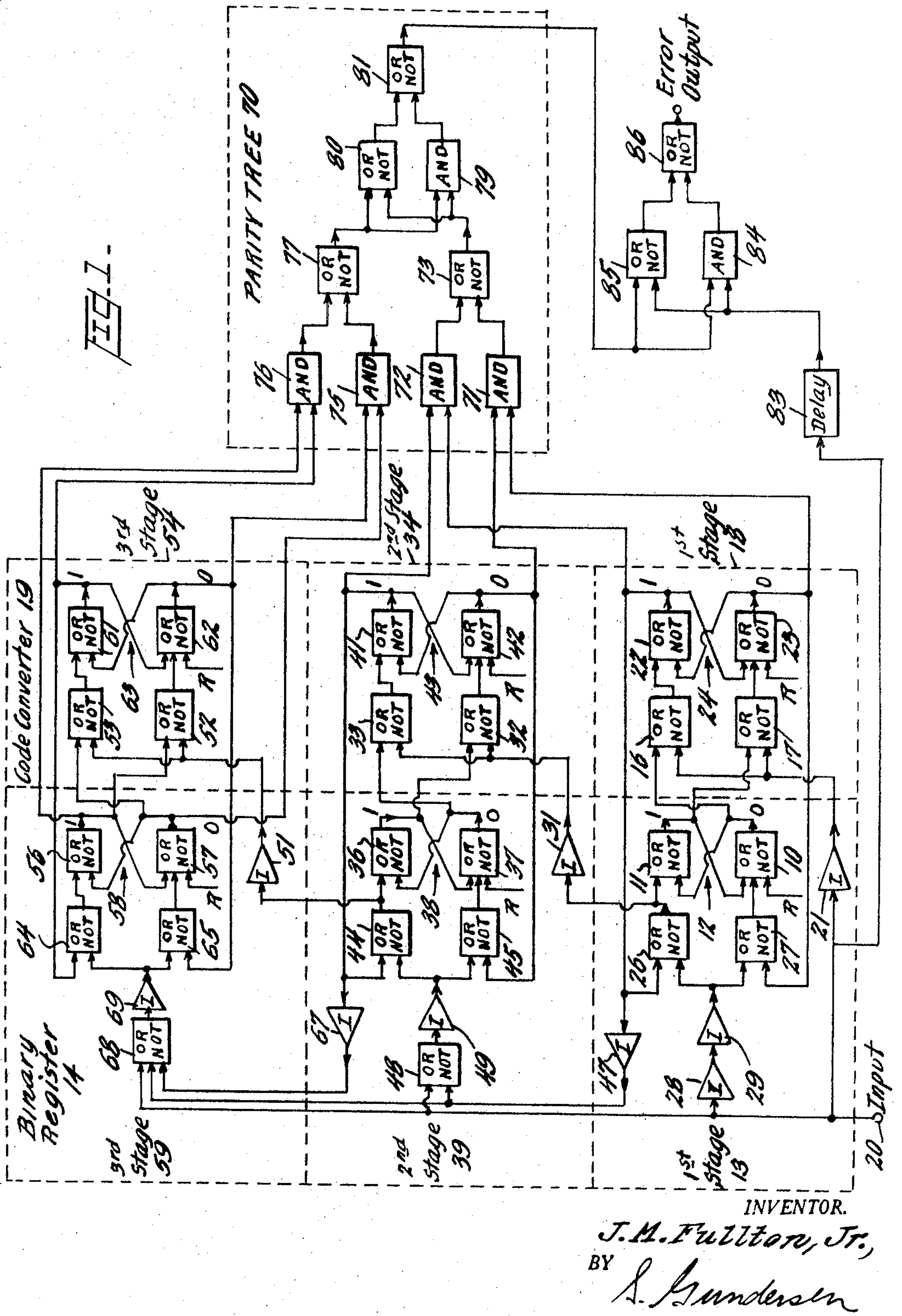
FIG. 1 is a block diagram of a circuit embodying the invention.

Throughout the following description and in the accompanying drawings, the following conventional terms are referred to:

Binary digits "0" and "1" may represent two relative values of voltage. For example, "0" may represent zero volt and "1" may represent ten volts.

OR-NOT gate refers to a logic circuit where a "0" applied to all inputs produces a "1" output. A "1" applied to any or all of the inputs produces a "0" output.

AND gate refers to a logic circuit where a "1" applied to all inputs produces a "1" output. A "0" applied to any or all inputs produces a "0" output.

Inverter circuit refers to a circuit which converts a "1" applied to the input to a "0" output and a "0" applied to the input to a "1" output.

The parity of a predetermined number of bistable stages is represented either by a "0" or a "1." A "0" represents none or an even number of bistable stages in a second state, and a "1" represents an odd number of bistable stages in the second state.

Refeerring first to FIG. 1, OR-NOT gates 10 and 11 are interconnected to form a bistable flip-flop 12 in a first stage 13 of a binary register 14. When the output of the OR-NOT gate 10 is "0" and the output of the OR-NOT gate 11 is "1," the flip-flop 12 is in a first state, and when the outputs are reversed, the flip-flop 12 is in its second state. The output of OR-NOT gate 10 is connected to an input of an OR-NOT gate 16 in a first stage 18 of a code converter 19, and the output of OR-NOT gate 11 is connected to an input of an OR-NOT gate 17 in the code converter stage 18. An input 20 of the register is connected to inputs on both OR-NOT gates 16 and 17 by an inverter 21. Initially, the flip-flop 12 is in the first state and when the first pulse, represented by a "1," is applied to the input 20, all the inputs on the OR-NOT gate 16 become "0" which produces a "1" on the output of OR-NOT gate 16.

The output of the OR-NOT gate 16 is connected to an input of an OR-NOT gate 26 in the first binary register an OR-NOT gate 23 to form a bistable flip-flop 24 in the first code converter stage 18. The application of a "1" by the OR-NOT gate 16 to the OR-NOT gate 22 switches the flip-flop 24 from its first state where the output of the OR-NOT gate 22 is "1" and the output of the OR-NOT gate 23 is "0" to its second state where the outputs of the OR-NOT gates 22 and 23 are reversed.

The output of the OR-NOT gate 22 is connected to an input of an OR-NOT gote 26 in the first binary register stage 13 and the output of the OR-NOT gate 23 is connected to an input of an OR-NOT gate 27 in the register stage 13. The input 20 is connected by two serially connected inverters 28 and 29 to inputs on both OR-NOT gates 26 and 27. When the flip-flop 24 is in its second state and a "0" is applied to the input 20, all the inputs of the OR-NOT gate 26 are zero to produce a "1" on the output of the OR-NOT gate 26 to switch the flip-flop 12 from its first state to its second state. The two serially connected inverters 28 and 29 delay the application of the "0" from the input 23 to the OR-NOT gates 26 and 27, thus preventing the switching of the flip-flop 12 before a "1" is applied to OR-NOT gates 16 and 17 by the inverter 21 which would erroneously trigger the flip-flop 24.

The output of the OR-NOT gate 26 is connected by an inverter 31 to inputs of two OR-NOT gates 32 and 33 in a second stage 34 of the code converter 19. Another input of the OR-NOT gate 32 is connected to an output of an OR-NOT gate 36 and similarly, an input of the OR-NOT gate 33 is connected to an output of an OR-NOT gate 37. The OR-NOT gates 36 and 37 are interconnected as a flip-flop 38 in a second stage 39 of the binary register 14. Initially, the flip-flop 38 is in its first state where the output of the OR-NOT gate 36 is "1" and the output of the OR-NOT gate 37 is "0." When the output of the OR-NOT gate 26 becomes "1" after the first input pulse, all the inputs of the OR-NOT gate 33 have "0's" applied thereto which produces a "1" on the output of the OR-NOT gate 33.

The output of the OR-NOT gate 33 is connected to an input of an OR-NOT gate 41 which is interconnected with an OR-NOT gate 42 to form a bistable flip-flop 43 in the second code converter stage 34. The application of a "1" by the OR-NOT gate 33 to the OR-NOT gate 41 switches the flip-flop 43 from its first state where the output of the OR-NOT gate 42 is "0" and the output of the OR-NOT gate 41 is "1" to its second state where the outputs of the OR-NOT gates 41 and 42 are reversed.

The output of the OR-NOT gate 41 is connected to an input of an OR-NOT gate 44 in the second binary stage 39 and the output of the OR-NOT gate 42 is connected to an input of an OR-NOT gate 42 is connected output of the OR-NOT gate 22 is connected by an inverter 47 to an input of OR-NOT gate 48. Another input of the OR-NOT gate 48 is connected to the input 20. An inverter 49 connects the output of the OR-NOT gate 48 to inputs of both OR-NOT gates 44 and 45.

During the application of a second pulse or a "1" to the input 20, all the inputs of the OR-NOT gate 17 are "0" to produce a "1" output applied to the OR-NOT gate 23 to trigger the flip-flop 24 from its second state to its first state. After the second pulse when a "0" is applied to the input 20, all the inputs to both OR-NOT gates 27 and 44 are "0" to produce respective "1" outputs. The "1" output of the OR-NOT gate 27 switches the flip-flop 12 from its second state to its first state and the "1" output of the OR-NOT gate 44 switches the flip-flop 38 from its first state to its second state whereupon the output of the OR-NOT gate 36 becomes "0" and the output of the OR-NOT gate 37 becomes "1."

The output of the OR-NOT gate 44 is also connected by an inverter 51 to inputs of two OR-NOT gates 52 and 53 in a third stage 54 of the code converter 19. Another input of the OR-NOT gate 52 is connected to an output of an OR-NOT gate 56 and similarly, an input of the OR-NOT gate 53 is connected to an output of an OR-NOT gate 57. The OR-NOT gates 56 and 57 are interconnected to form a flip-flop 58 in a third stage 59 of the binary register 14. Initially, the flip-flop 58 is in its first state where the output of the OR-NOT gate 56 is "1" and the output of the OR-NOT gate 57 is "0." When the output of the OR-NOT gate 44 becomes "1" after the second input pulse, all the inputs of the OR-NOT gate 53 have "0's" applied thereto which produces a "1" output of the OR-NOT gate 53.

The output of the OR-NOT gate 53 is connected to an input of an OR-NOT gate 61 which is interconnected with an OR-NOT gate 62 to form a bistable flip-flop 63 in the third code converter stage 54. The application of a "1" by the OR-NOT gate 53 to the OR-NOT gate 61 switches the flip-flop 63 from its first state where the output of the OR-NOT gate 61 is "1" and the output of the OR-NOT gate 62 is "0" to its second state where the outputs of the OR-NOT gates 61 and 62 are reversed.

The output of the OR-NOT gate 61 is connected to an input of an OR-NOT gate 64 in the third binary register stage 59 and the output of the OR-NOT gate 62 is connected to an input of an OR-NOT gate 65 in the register stage 59. The output of the OR-NOT gate 22 is connected by the inverter 47 to one input of an OR-NOT gate 68 and the output of the OR-NOT gate 41 is connected by an inverter 67 to a second input of the OR-NOT gate 68. A third input of the OR-NOT gate 68 is connected to the input 20. An inverter 69 connects the output of the OR-NOT gate 68 to inputs of both OR-NOT gates 64 and 65.

The application of a third pulse or "1" to the input 20 produces "0's" on all the inputs to the OR-NOT gate 16 to switch the bistable flip-flop 24 from its first state to its second state. During the application of the "0" to the input 20 following the third pulse, all the inputs of the OR-NOT gate 26 become "0" to produce a "1" on the output of the OR-NOT gate 26 to switch the flip-flop 12 from its first state to its second state. The "1" output of the OR-NOT gate 26 is applied as a "0" by the inverter 31 to the OR-NOT gates 32 and 33 to produce "0's" on all the inputs to the OR-NOT gate 32. The output of the OR-NOT gate 32 becomes "1" to switch the flip-flop 43 from its second state to its first state.

The application of a fourth pulse or "1" to the input 20 produces "0's" on all the inputs to the OR-NOT gate 17 to switch the flip-flop 24 from its second state to its first state. During the application of the "0" to the input 20 following the fourth pulse, all the inputs of the OR-NOT gates 27, 48, 45, 68, and 64 become "0" to produce "1's" on their respective outputs. The "1" output of the OR-NOT gate 27 switches the flip-flop 12 from its second state to its first state. Similarly, the "1" output of the OR-NOT gate 45 switches the flip-flop 38 from its second state to its first state. The "1" output of the OR-NOT gate 64 triggers the flip-flop 58 from its first state to its second state whereupon the output of the OR-NOT gate 56 becomes "0" and the output of the OR-NOT gate 57 becomes "1."

On the fifth pulse or "1" applied to the input 20, the flip-flop 24 switches from its second state to its first state. On the "0" applied to the input 20 following the fifth pulse, the flip-flops 12 and 43 switch from their first states to their second states.

On the sixth pulse or "1" applied to the input 20, the flip-flop 24 switches from its second state to its first state. During the application of a "0" to the input 20 following the sixth pulse, the flip-flops 12 and 63 switch from their second states to their first states and the flip-flop 38 switches from its first state to its second state.

The application of a seventh pulse or "1" on the input 20 switches the flip-flop 24 from its first state to its second state. Upon the application of a "0" to the input 20 following the seventh pulse, the flip-flop 12 switches from its first state to its second state and the flip-flop 43 switches from its second state to its first state.

On the eighth pulse applied to the input 20, the flip-flop 24 switches from its second state to its first state. During the application of a "0" to the input 20 following the eighth pulse, the flip-flops 12, 38, and 58 change from their second state to their first state; thus, the three-stage binary register 14 and code converter 19 cycles to its initial condition with all the flip-flops 12, 24, 38, 43, 58, and 63 in their first state.

If it is desired to reset the binary register 14 and the code converter 19 to their initial conditions before the end of an eight pulse cycle, then a pulse or "1" is applied to all the reset inputs R of the flip-flops 12, 24, 38, 43, 58, and 63.

In FIG. 2, the flip-flops of the stages 13, 39, 59, 18, 34, and 54 in the first state are represented by "0's" and the stages in the second state are represented by "1's". The three stages 13, 39, and 59 in the binary register 14 follow the pattern of an ordinary binary register. The parity of the three binary stages 13, 39, and 59 follows an irregular pattern which does not correspond to the presence and absence of input pulses. During the first four input pulses, the three stages 18, 34, and 54 of the converter follow a Gray code and the parity of the three converter stages 18, 34, and 54 alternate in correspondence with the presence and absence of an input pulse during the first four input pulses.

If a fourth stage (not shown) were added to the code converter 19 and connected to the output of the OR-NOT gate 64 in a manner similar to previous stages, then the parity of the four-stage code converter would alternate in correspondence with the presence and absence of an input pulse during 8 input pulses.

The third binary stage 59 switches from its first state to its second state at the same time the fourth code converter stage (not shown) would switch from its first state to its second state. Thus, the parity of the three-code converter stages 18, 34, and 54, and the third binary stage 59 alternate during an 8 input pulse cycle and it is not necessary to have a fourth converter stage.

Referring back to FIG. 1, the parity of the combined three-stage code converter and the third stage of the binary register is sensed by a conventional parity tree 70. The outputs of the OR-NOT gates 23 and 42 are connected to respective inputs of an AND gate 71 which produces a "1" output when both flip-flops 24 and 43 are in their second state. The outputs of the OR-NOT gates 22 and 41 are connected to respective inputs of an AND gate 72 to produce a "1" output when both flip-flops 24 and 43 are in their first state. The outputs of the AND gates 71 and 72 are connected to respective inputs of an OR-NOT gate 73 which produces a "1" output only when the flip-flops 24 and 43 are in different states.

The outputs of the OR-NOT gates 57 and 62 are connected to respective inputs of an AND gate 75 which produces a "1" output when both flip-flops 58 and 63 are in their second states. The outputs of the OR-NOT gates 56 and 61 are connected to respective inputs of an AND gate 76 which produces an output when both flip-flops 58 and 63 are in their first states. An OR-NOT gate 77 has respective inputs connected to the outputs of AND gates 75 and 76 to produce a "1" output only when the flip-flops 58 and 63 are in different states.

The outputs of the OR-NOT gates 73 and 77 are connected to respective inputs of an AND gate 79 which produces a "1" output only when both OR-NOT gates 73 and 77 have a "1" output. The outputs of OR-NOT gates 73 and 77 are also connected to respective inputs of an OR-NOT gate 80 which produces a "1" output when both OR-NOT gates 73 and 77 have a "0" output. An OR-NOT gate 81 has respective inputs connected to the outputs of the AND gate 79 and the OR-NOT gate 80 to produce a "1" on the output of the parity tree when an odd number of the flip-flops 24, 43, 58, and 63 are in the second state and to produce an output of "0" of the parity tree when none or an even number of the flip-flops 24, 43, 58, and 63 are in the second state.

The output of the parity tree is then compared to the input signal applied to the input 20 to produce an error signal if the parity of the three-code converter stages 18, 34, and 54 and the third binary stage 59 does not correspond to the input signal. The input 20 is connected by a delay circuit 83 to respective inputs of an AND gate 84 and an OR-NOT gate 85. The output of the OR-NOT gate 81 in the parity tree 70 is connected to other respective inputs of the AND gate 84 and the OR-NOT gate 85. The outputs of the AND gate 84 and the OR-NOT gate 85 are connected to respective inputs of an OR-NOT gate 86 which produce a "1" output only when the output of the parity tree 70 does not correspond to the input signal. The delay circuit 83 delays the application of the input signal to the gates 84 and 85 for a duration equal to the sum of the switching times of the binary register 14, the code converter 19, and the parity tree 70. The circuit is self-checking; that is, if a malfunction occurs in either the binary register 14, the code converter 19, or the parity 70, the malfunction will be sensed by the comparing circuit which includes the AND gate 84 and OR-NOT gates 85 and 86.

Alternately, the circuit for comparing the signal or input 20 to the output of the parity tree 70 may be modified so that it compares only a portion of the input signal to the output of the parity tree 70. In the modification, the OR-NOT gates 85 and 86 are eliminated, and the input of the delay circuit 83 is connected to the output of the inverter 21. An error output signal or "1" is produced by the AND gate 84 if a "1" erroneously appears on the output of the parity tree 70 when a "0" is applied to the input 20. The portion of the input signal compared to the output of the parity tree 20 may be made even smaller by inserting a gate circuit (not shown) in series with the input of delay circuit 83 and the output of the inverter 21. The gate circuit would then be triggered to pass a "1" from the inverter 21 only during a selected portion of the time that the "0" is applied to the input 20.

The code converter stages 18, 34, and 54 may be used as stages of a register or a counter. The states of the code converter stages 18, 34, and 54 may be sensed while a "1" is applied to the input 20 to determine the eight different binary numbers, or the states of the code converter stages 18, 34, and 54 may be sensed while a "0" is applied to the input 20 to determine the eight different binary numbers.

It is to be understood that the above-described circuits are simply illustrative of an application of the principles of the invention and many other modifications may be made without departing from the scope of the invention.

What is claimed is:

1. A circuit for checking a binary register having a plurality of bistable stages operated by successive pulses in a signal applied to an input of the register wherein the states of all the stages represent numbers of a first code corresponding to the quantity of input pulses and the parity of the numbers of the first code changes in an irregular pattern as successive pulses are applied to the input of the register, comprising:

means coupled to the stages and the input of the register for converting the numbers of the first code to numbers of a second code wherein the parity of the numbers of the second code alternate in a regular pattern corresponding to the presence and absence of an input pulse; and means coupled to the converting means and the input of the register for comparing the parity of the numbers of the second code to the presence and absence of an input pulse to check the operation of the binary register.

2. An error checking circuit as defined in claim 1 wherein:

the converting means has a plurality of bistable stages which correspond to respective stages of the register with the first stage of the converting means coupled to (a) the input of the register and (b) the first stage of the register and with each succeeding stage of the converting means coupled to (a) the respective corresponding stage of the register and (b) the stage of the register corresponding to the preceding stage of the converting means.

3. An error checking circuit as defined in claim 2 wherein:

the comparing means is coupled to (a) all the stages of the converting means, (b) the last stage of the register, and (c) the input of the register for comparing the parity of all the stages of the converting means and the last stage of the register to the presence and absence of an input pulse to check the operation of the binary register.

4. An error detecting circuit as defined in claim 2 wherein each bistable stage of the converting means comprises the following:

a bistable element having first and second stable states; and logic means having (a) an output connected to the bistable element, (b) a first input connected to the respective corresponding stage in the register, and (c) a second input connected to the stage of the register corresponding to the preceding stage of the converting means for switching the bistable element from its first state to its second state in response to (a) the respective corresponding stage of the register being in a first state and (b) the stage of the register corresponding to the preceding stage of the converting means changing from a first state to a second state, and for switching the bistable element from its second state to its first state in response to (a) the respective corresponding stage of the register being in the second state and (b) the stage of the register corresponding to the preceding stage of the converting means changing from a first state to a second state;

said second input of the logic means in the first stage of the converting means connected to the input of the register for switching the bistable element in the first stage from its first state to its second state in response to (a) the first stage of the register being in the first state and (b) an input pulse, and for switching the bistable element in the first stage from its second state to its first state in response to (a) the first stage of the register being in a second state and (b) an input pulse.

5. An error detecting circuit as defined in claim 4 wherein the comparing means is coupled to (a) all the bistable elements in the converting means, (b) the last stage of the register, and (c) the input of the register for comparing the parity of all the bistable elements of the converting means and the last stage of the register to the presence and absence of an input pulse to check the operation of the binary register.

6. An error detecting circuit, comprising:

input means for supplying an input signal having a succession of alternating first and second values;

a first series of $n$ bistable elements each having first and second stable states;

a first group of $n$ logic means wherein the $n$th logic means has an output connected to the input of the $n$th bistable element in the first series and has an input connected to the input means for switching the respective bistable element from its first stable state to its second stable state in response to a first condition and for switching the bistable element from its second stable state to its first stable state in response to a second condition;

a second series of $n$ bistable elements each having first and second stable states wherein the $n$th and all preceding $n-1$ bistable elements of the second series have outputs connected to respective inputs of the $n$th logic means of the first group; whereby said first switching condition for the $n$th bistable element in the first series being that (1) the $n$th bistable element of the second series is in the second state, (2) all preceding $n-1$ bistable elements of the second series are in the first state, and (3) the input signal has the first value;

said second switching condition for the $n$th bistable element in the first series being that (1) the $n$th bistable element of the second series is in the first state, (2) all preceding $n-1$ bistable elements of the second series are in the first state, and (3) the input signal has the first value;

a second group of $n$ logic means wherein the $n$th logic means has an output connected to the input of the $n$th bistable element in the second series and has one input connected to the output of the $(n-1)$th logic means of the first group and a second input connected to the output of the $n$th bistable element in the first series, for switching the $n$th bistable element in the second series from its first state to its second state in response to the $n$th bistable element of the first series being in the first state and the $(n-1)$th logic means of the first group operating in response to the first condition and for switching the $n$th bistable element in the second series from its second state to its first state in response to the $n$th bistable element of the first series being in the second state and the $(n-1)$th logic means of the first group operating in response to the first condition;

said first logic means of the second group having the one input connected to the input means, for switching from the first state to the second state in response to the first bistable element being in the first condition and the input signal having the second value, and for switching from the second state to the first state in response to the first bistable element being in the second condition and the input signal having the second value;

means connected to the outputs of the bistable elements of the second series and the "$n$th" bistable element of the first series for producing a parity signal indicative of an odd number of the connected elements being in the second state; and means connected to the input means and the parity signal producing means for comparing the parity signal to the input signal to check the operation of the circuit.

References Cited

UNITED STATES PATENTS

| | | | |
|---|---|---|---|
| 3,296,460 | 1/1967 | Nelson | 307—215 X |
| 3,331,953 | 6/1967 | Rouzier | 235—153 |
| 3,393,298 | 6/1968 | Olson | 340—347 X |

MALCOLM A. MORRISON, Primary Examiner

R. S. DILDINE, JR., Assistant Examiner

U.S. Cl. X.R.

340—347

L-566-PT
(6-69)

UNITED STATES PATENT OFFICE
CERTIFICATE OF CORRECTION

Patent No. 3,470,364 Dated September 30, 1969

Inventor(s) J. M. FULLTON, JR.

It is certified that error appears in the above-identified patent and that said Letters Patent are hereby corrected as shown below:

Column 2, line 27, delete "26 in the first binary registe and insert --22 which is interconnected with--;

Column 2, line 36, delete "gote" and insert --gate--;

Column 3, line 6, delete "42 is connected" and insert --4 in the stage 39. The--;

Column 4, line 15, delete "second" and insert --first--; and

Column 4, line 15, delete "first" and insert --second--.

SIGNED AND
SEALED
MAY 12 1970

(SEAL)
Attest:

Edward M. Fletcher, Jr.
Attesting Officer

WILLIAM E. SCHUYLER, JR.
Commissioner of Patents